US008184323B2

(12) United States Patent
Matsuo

(10) Patent No.: US 8,184,323 B2
(45) Date of Patent: May 22, 2012

(54) PRINT JOB DELIVERY SYSTEM

(75) Inventor: Atsushi Matsuo, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 739 days.

(21) Appl. No.: 12/319,488

(22) Filed: Jan. 8, 2009

(65) Prior Publication Data
US 2009/0185217 A1 Jul. 23, 2009

(30) Foreign Application Priority Data

Jan. 21, 2008 (JP) ................... 2008-010605

(51) Int. Cl.
*G06F 3/12* (2006.01)
*G06K 15/00* (2006.01)
(52) U.S. Cl. ...................... 358/1.15; 358/1.13
(58) Field of Classification Search .................... None
See application file for complete search history.

(56) References Cited

U.S. PATENT DOCUMENTS

| | | | | |
|---|---|---|---|---|
| 8,019,829 B2 * | 9/2011 | Cocotis et al. | ................ | 709/217 |
| 2003/0007818 A1 | 1/2003 | Kato | | |
| 2004/0046786 A1 | 3/2004 | Tanimoto | | |
| 2004/0098471 A1 * | 5/2004 | Shima | ........................... | 709/221 |
| 2005/0094197 A1 * | 5/2005 | Kim | ........................... | 358/1.15 |
| 2005/0168765 A1 * | 8/2005 | Akune et al. | ................ | 358/1.13 |
| 2006/0126118 A1 * | 6/2006 | Nagata | ........................... | 358/1.15 |

FOREIGN PATENT DOCUMENTS

| | | |
|---|---|---|
| CN | 1396517 | 2/2003 |
| JP | H11-194911 A | 7/1999 |
| JP | 2004-102558 | 4/2004 |
| JP | 2004-214731 | 7/2004 |
| JP | 2005-011243 | 1/2005 |
| JP | 2006-277004 | 10/2006 |

* cited by examiner

*Primary Examiner* — Gabriel Garcia
(74) *Attorney, Agent, or Firm* — George W. Neuner; Edwards Wildman Palmer LLP

(57) ABSTRACT

An image delivery system includes an image delivery server, a plurality of image processors, and an information processor, which are connected by a network. The image delivery server delivers a print job to the image processor. The image delivery server includes a data recording unit, a setting recording unit, an updating unit, and a delivery unit. The setting recording unit receives delivery job data and records the received data in the data recording unit. The delivery job data includes at least image data and delivery job setting information for the image processor. The updating unit can update the recorded delivery job setting information based on input from the image processor. The delivery unit delivers a print job to the image processor based on the updated delivery job setting information.

6 Claims, 11 Drawing Sheets

PRINT JOB DELIVERY SYSTEM

CROSS REFERENCE

This Nonprovisional application claims priority under 35 U.S.C. §119(a) on Patent Application No. 2008-10605 filed in Japan on Jan. 21, 2008 the entire contents of which are hereby incorporated by reference.

BACKGROUND OF THE INVENTION

The present invention relates to an image delivery system including an image delivery server, image processors, and an information processor, which are connected together through a network. The image delivery server delivers a job simultaneously to the image processors.

For example, JP H11-194911 A discloses a conventional image delivery system including a number of image processors, to which a print job can be delivered simultaneously. For efficient printing of a number of image data, this system distributes them at a suitable ratio and allocates the distributed data to the image processors.

In the conventional image delivery system, uniform job setting information can be delivered to the image processors. More specifically, when the same image data is delivered to the image processors, only one printing method (for example, layout printing, the number of sheets, double-side printing, or post-processing) is specified, because the image data deliverer takes a great deal of time to specify job setting information for each destination. However, uniform print job setting may cause image data to be printed under conditions not desired by the receivers of the data.

The object of the present invention is to provide an image delivery system having great freedom of print job setting for image data without increasing the burden on the deliverer of the data.

SUMMARY OF THE INVENTION

An image delivery system according to the present invention includes an image delivery server, a plurality of image processors, and an information processor, which are connected by a network. The image delivery server delivers a print job to the image processor. The image delivery server includes a data recording unit, a setting recording unit, an updating unit, and a delivery unit.

The setting recording unit receives job data and records the received data in the data recording unit. The job data includes at least image data and delivery job setting information. The image data may be photographic data, document data, or any other data that can be processed for image formation. The delivery job setting information may be setting information about a printing method (for example, layout printing, the number of sheets, double-side printing, or post-processing). The updating unit can, based on input from the image processor, update the delivery job setting information recorded in the data recording unit for each image processor. The delivery unit delivers a print job to the image processor based on the updated delivery job setting information.

In order to change the printing method only for the image data delivered to a specified image processor, the receiver of the image data can suitably change the printing method. This obviates the need for the deliverer of the image data to deliver the data after changing the printing method.

The receiver of a print job can change the print job setting for the image data managed by the image delivery server. This makes the image data less liable to be printed under a condition not desired by the job receiver.

DETAILED DESCRIPTION OF THE INVENTION

Figure 1:
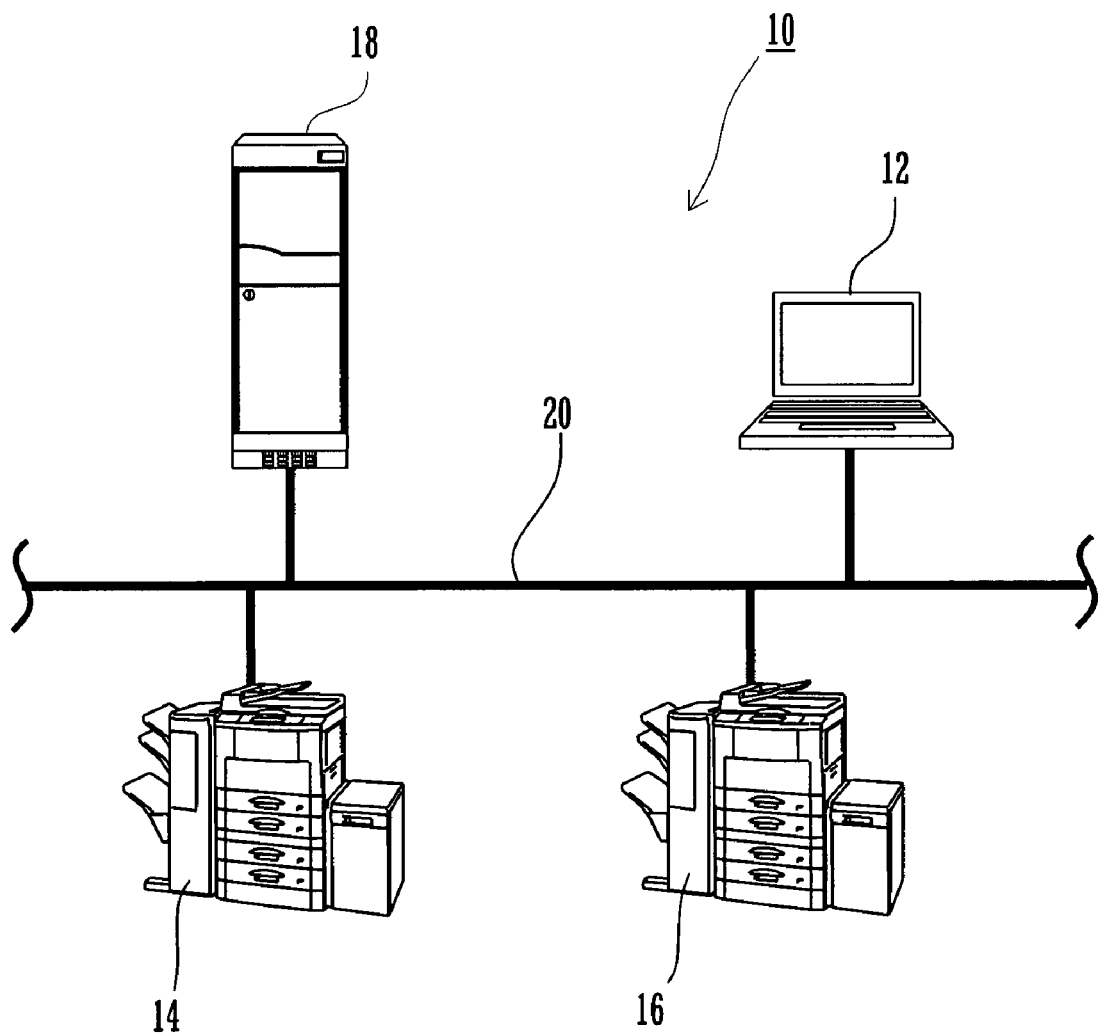
FIG. 1 is a schematic diagram of an image delivery system embodying the present invention.

FIG. 1 schematically shows an image delivery system 10 embodying the present invention. The system 10 includes a local area network (LAN) 20, which might be replaced by the Internet or another WAN. The system 10 further includes an image delivery server 18, an information processor 12, and image processors 14 and 16. The server 18 and the processors 12, 14, and 16 can communicate with each other through the network 20.

The image delivery server 18 receives delivery job setting information from the information processor 12. The delivery job setting information may be image data, print setting information, and destination information. The image delivery server 18 creates image delivery job data, which is a print job data packet, based on the received information. The image delivery server 18 transmits the created job data to the image processors 14 and 16.

The information processor 12 supplies the image processors 14 and 16 with a print job command based on an entry operation of an operator on the information processor. The information processor 12 creates an image delivery command based on the entry operation and supplies it to the image delivery server 18. The image delivery command includes information (for example, image data, print setting information, destination information, etc.) on an image delivery job. The information processor 12 is a personal computer but might be another information processor.

The image processors 14 and 16 perform image formation based on a print job supplied from the information processor 12 or the image delivery server 18. The image processors 14 and 16 are connected to the network 20, as shown in FIG. 1, but one or more image processors might be connected to the network 20. The present invention is more effective or advantageous if it includes more image processors. However, the invention can be carried out even with one image processor.

Figure 2:
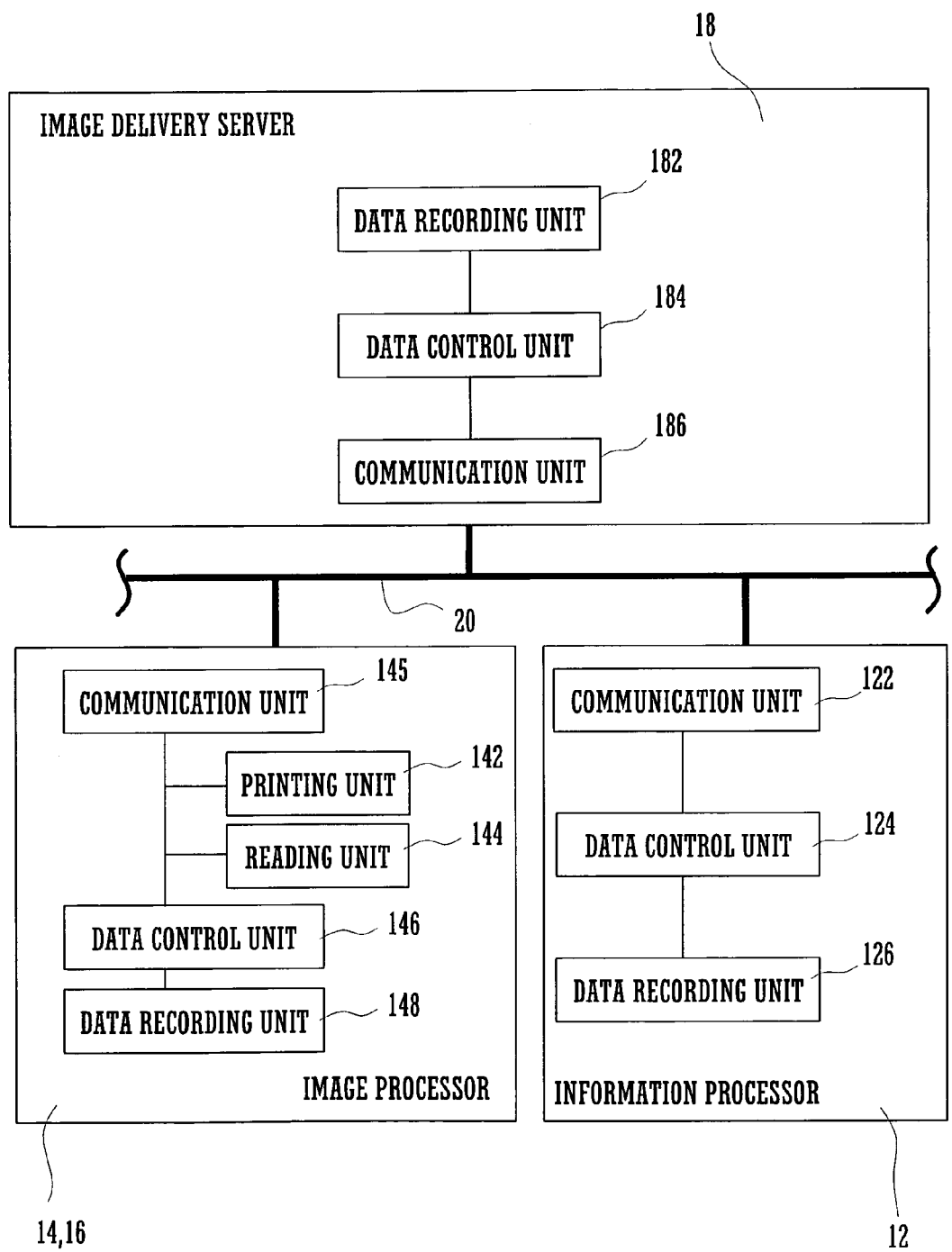
FIG. 2 is a block diagram of the image delivery system.

FIG. 2 is a block diagram of the image delivery system 10. As shown in FIG. 2, the image delivery server 18 includes a data recording unit 182, a data control unit 184, and a communication unit 186. The data recording unit 182 is a hard disk but might be a nonvolatile memory. The data control unit 184 embodies the setting recording unit, updating unit, delivery unit, historical information recording unit, historical information transmission unit, and historical information retrieval unit of the present invention by reading in the program stored in the data recording unit 182. The communication unit 186 communicates with the outside of the image delivery server 18.

The information processor 12 includes a communication unit 122, a data control unit 124, and a data recording unit 126. The communication unit 122 communicates with the outside of the information processor 12. The data control unit 124 controls the data communication with the outside of the information processor 12. The data recording unit 126 is a hard disk but might be a nonvolatile memory.

Each of the image processors 14 and 16 includes a communication unit 145, a data control unit 146, a data recording unit 148, a printing unit 142, and a reading unit 144. The communication unit 145 communicates with the outside of the associated image processor 14 or 16. The data control unit 146 controls the data communication with the outside of the associated image processor 14 or 16. The data recording unit 148 is a hard disk but might be a nonvolatile memory. The printing unit 142 performs electrophotographic image formation but could perform ink jet image formation or other image formation. The reading unit 144 optically reads an image and creates image data. The reading unit 144 is fitted to the associated image processor 14 or 16, but a reading unit is not essential for the present invention.

Figure 3:
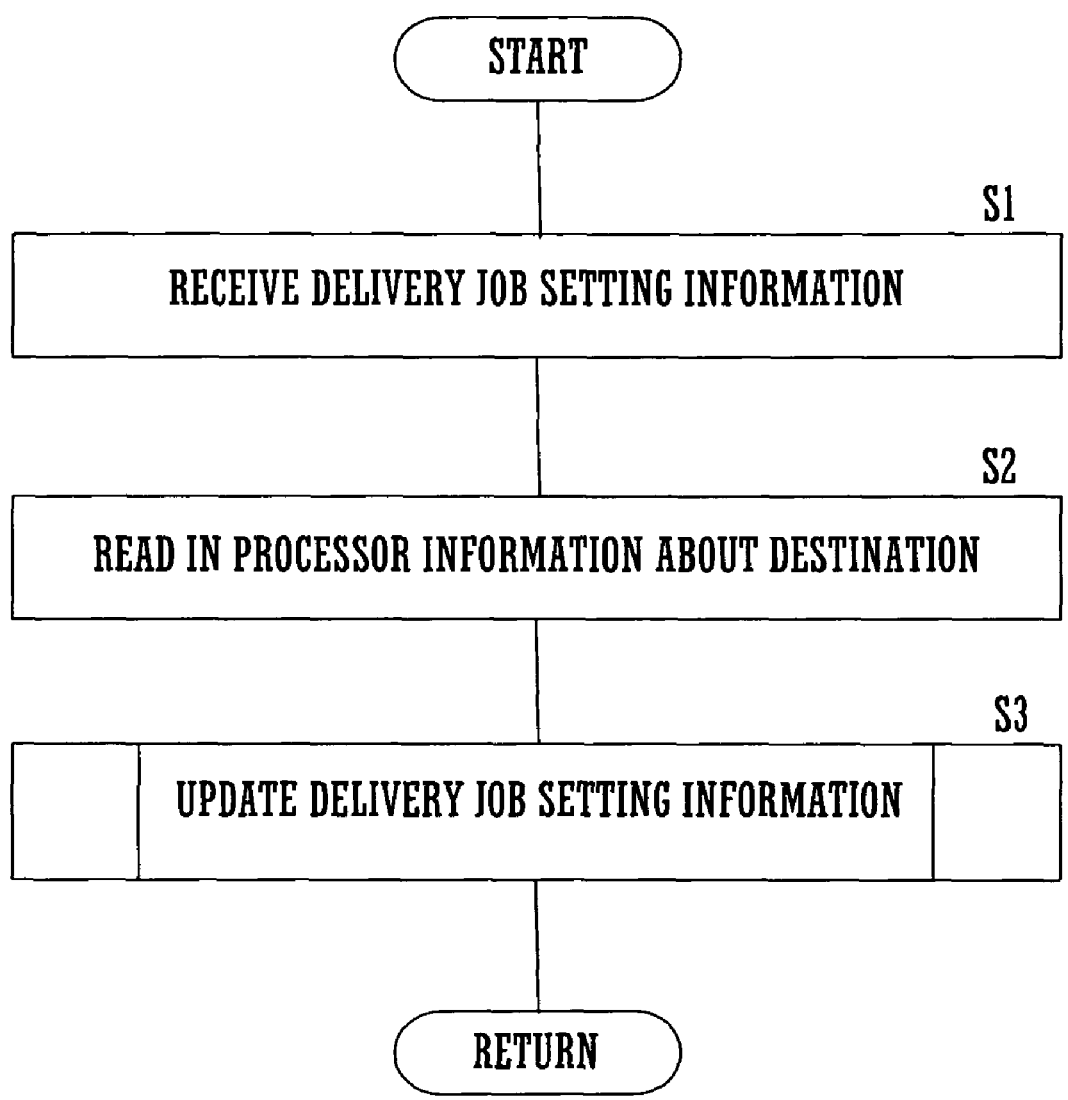
FIG. 3 is a flowchart showing the procedure of setting change performed by the image delivery server of the image delivery system.

FIG. 3 is a flowchart showing the procedure of setting change performed by the image delivery server 18.

First, the data control unit 184 of the server 18 receives delivery job setting information, which includes processor information, from one or both of the image processors 14 and 16 (S1).

Next, the data control unit 184 reads in the processor information (S2).

Next, the data control unit 184 updates the delivery job setting information (S3).

Figure 4:
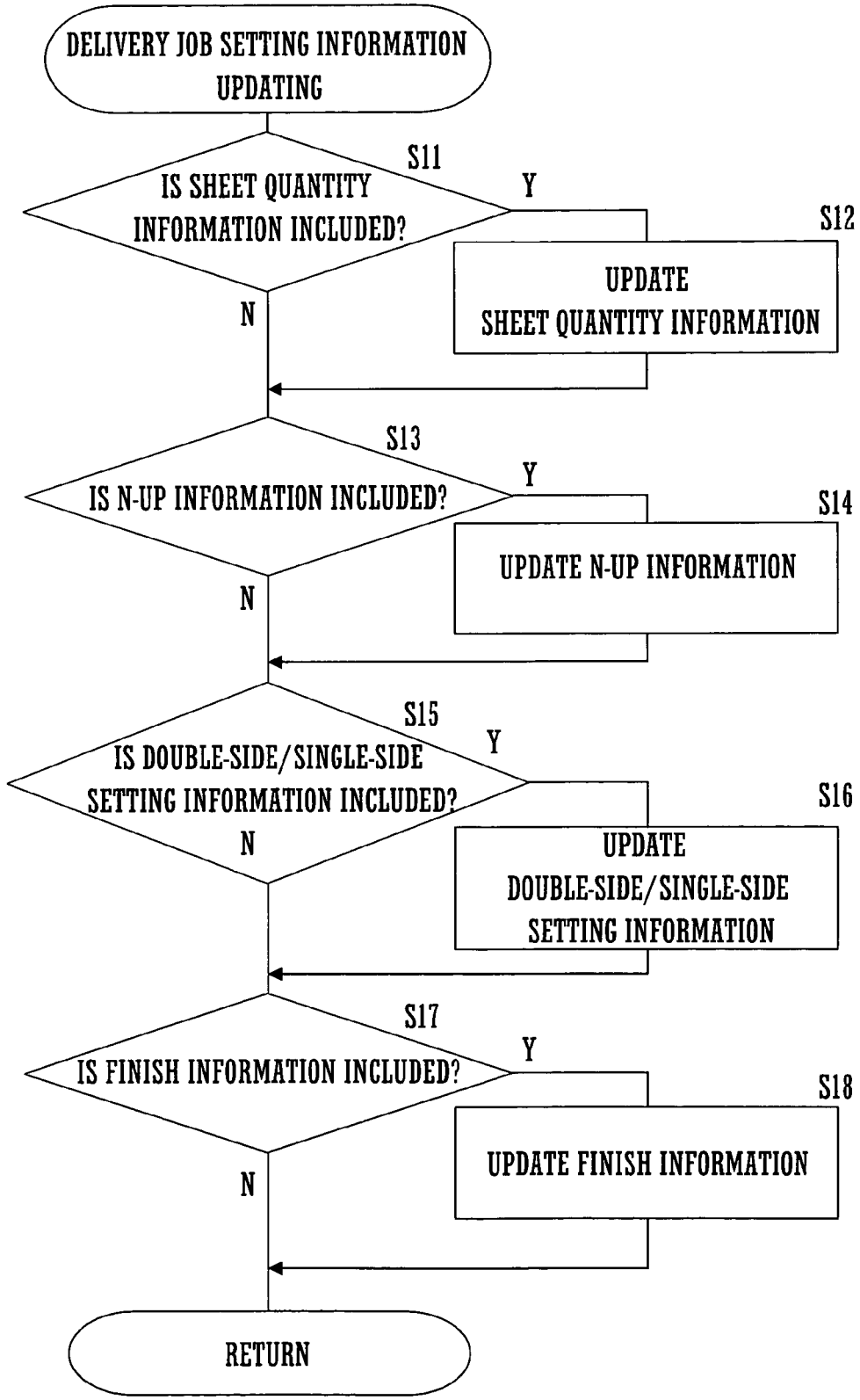
FIG. 4 is a flowchart showing the procedure performed by the image delivery server at a step of updating delivery job setting information.

FIG. 4 is a flowchart showing the procedure performed by the image delivery server 18 at the step S3 of updating delivery job setting information.

First, the data control unit 184 of the server 18 determines whether the received delivery job setting information includes sheet quantity information about the number of sheets (S11).

If it is determined at the step S11 that sheet quantity information is included, the data control unit 184 updates the sheet quantity information recorded in the data recording unit 182 (for example, from one sheet to three sheets) (S12).

Next, the data control unit 184 determines whether the received delivery job setting information includes N-up information about layout printing of two or more images on one page (S13).

If it is determined at the step S13 that N-up information is included, the data control unit 184 updates the N-up information recorded in the data recording unit 182 (for example, from 4 in 1 to 2 in 1) (S14).

Next, the data control unit 184 determines whether the received delivery job setting information includes double-side/single-side setting information (S15).

If it is determined at the step S15 that double-side/single-side setting information is included, the data control unit 184 updates the double-side/single-side setting information recorded on the data recording unit 182 (for example, from single-side printing to double-side printing) (S16).

Next, the data control unit 184 determines whether the received delivery job setting information includes finish information (S17).

If it is determined at the step S17 that finish information is included, the data control unit 184 updates the finish information recorded on the data recording unit 182 (for example, from no finish to stapling) (S18).

Figure 5:
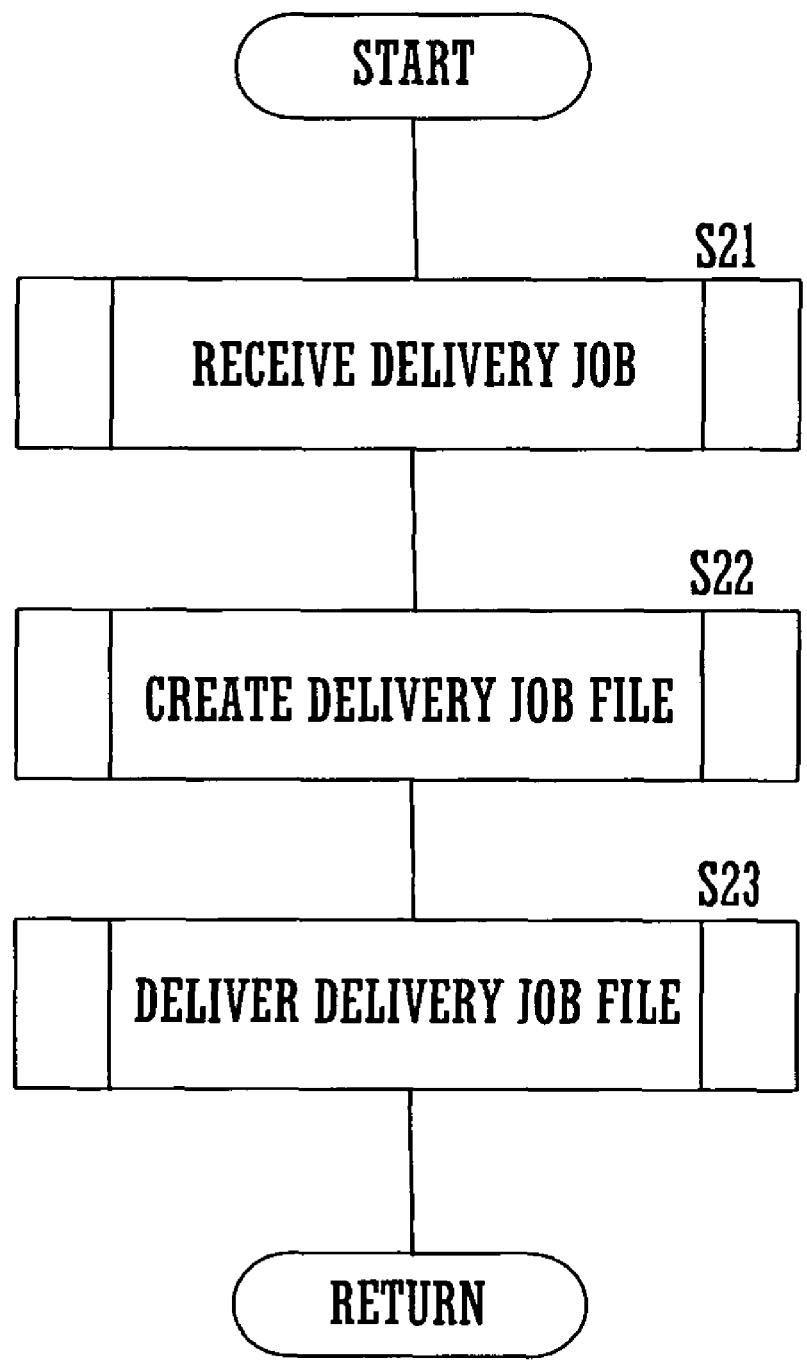
FIG. 5 is a flowchart showing the procedure performed by the image delivery server when the server delivers a job.

FIG. 5 is a flowchart showing the procedure performed by the image delivery server 18 when the server delivers a job.

First, the data control unit 184 of the server 18 analyzes the job file received from the information processor 12 on a job. The data control unit 184 records the analyzed file as setting information about the job in the data recording unit 182 of the server 18 (S21).

Next, the data control unit 184 analyzes the received job by reading in the print setting information recorded in the data recording unit 182 about the image processor(s) 14, 16 to which the image delivery server 18 delivers the job. Then, the control unit 184 creates one or more delivery job files for the classified print setting information (S22).

Next, the data control unit 184 reads in the information recorded in the data recording unit 182 about the image processor(s) 14, 16 to which the image delivery server 18 delivers the job. Then, the control unit 184 transmits to the image processor(s) 14, 16 the job file(s) created at the step S22 (S23).

Figure 6:
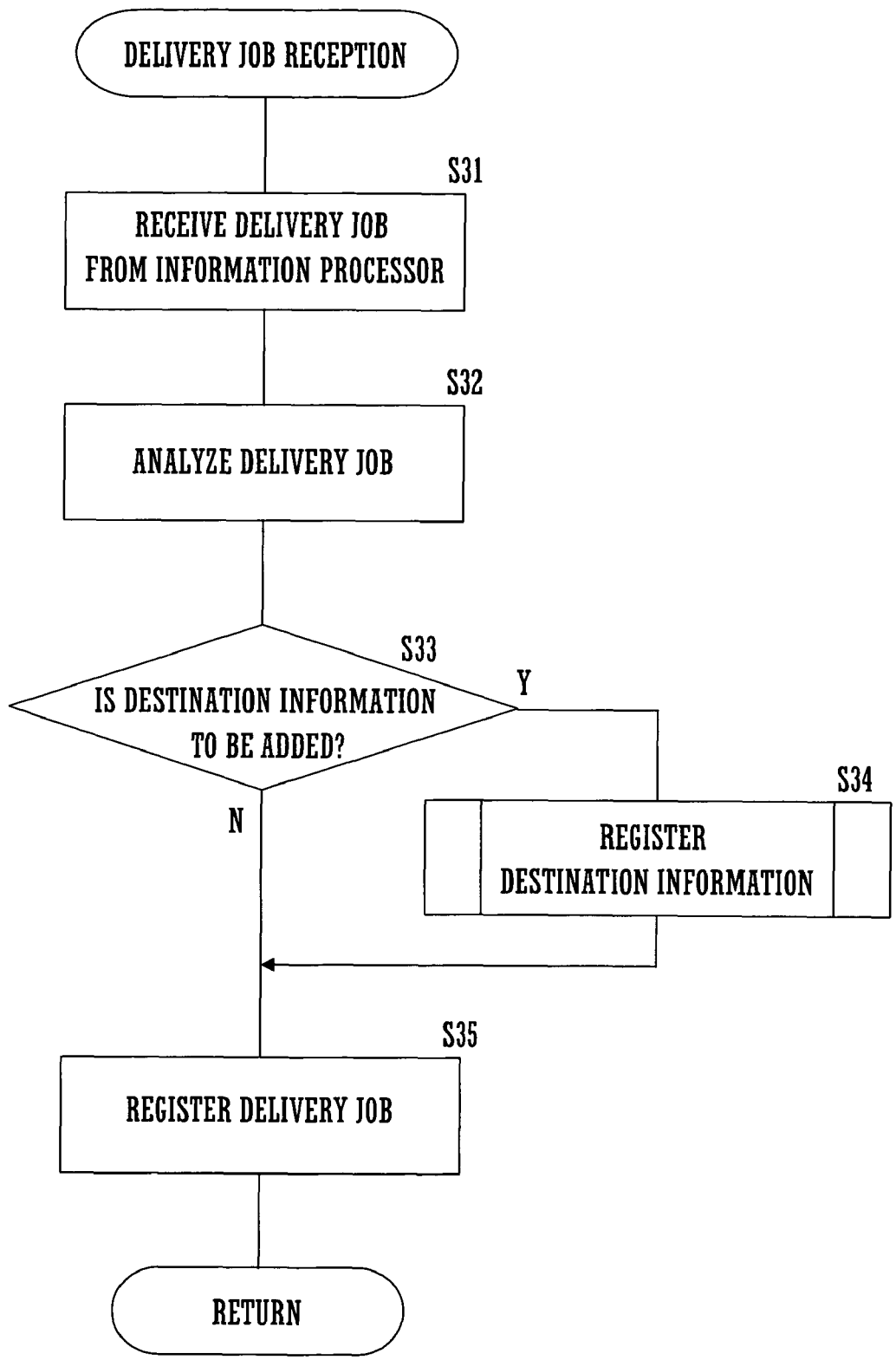
FIG. 6 is a flowchart showing the procedure performed by the image delivery server when the server receives a delivery job.

FIG. 6 is a flowchart showing the procedure performed by the image delivery server 18 when the server receives a delivery job.

First, the communication unit 186 of the server 18 receives a delivery job from the information processor 12. Then, the server 18 stores the received job in its data recording unit 182 (S31).

Next, the data control unit 184 of the server 18 analyzes the destination information and print setting information about the received job (S32).

Next, the data control unit 184 reads in the destination information recorded in the data recording unit 182. Then, the control unit 184 determines whether new destination information is to be registered (S33).

If it is determined at the step S33 that no new destination information is to be registered, the data control unit 184 registers delivery job information (for example, print information) in the data recording unit 182 (S35). If it is determined at the step S33 that new destination information is to be registered, the step 35 is preceded by the step S34 of registering the destination information.

Figure 7:
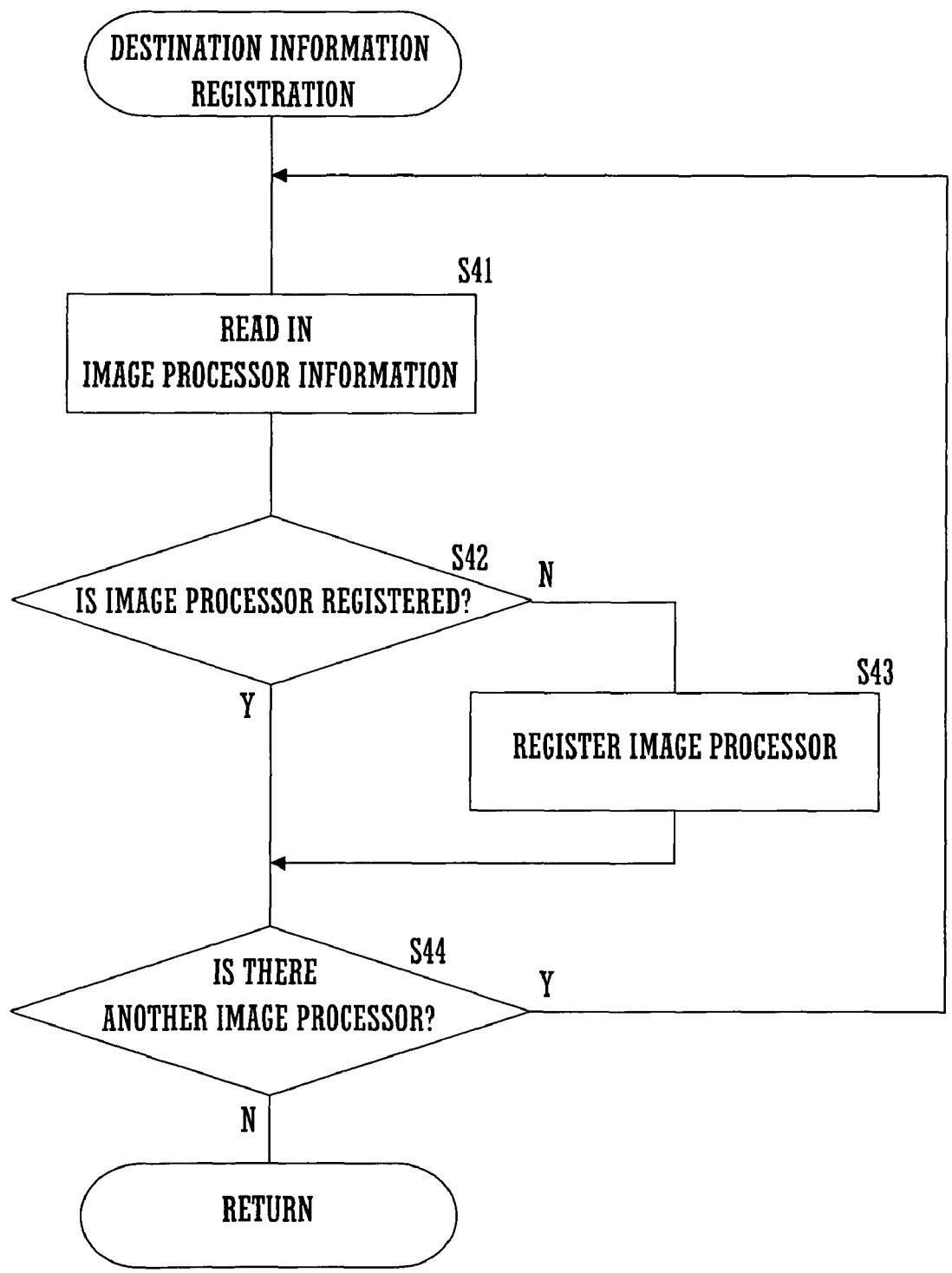
FIG. 7 is a flowchart showing the procedure performed by the image delivery server at a step of registering destination information.

FIG. 7 is a flowchart showing the procedure performed by the image delivery server 18 at the step S34 of registering destination information.

First, the data control unit 184 of the server 18 reads in the information on the image processor(s) 14, 16 to which the server delivers the job (S41).

Next, the data control unit 184 determines whether the image processor(s) 14, 16 is/are registered in the data recording unit 182 of the server 18 (S42).

If it is determined at the step S42 that the image processor(s) 14, 16 is/are registered in the data recording unit 182, the data control unit 184 determines whether the server 18 is to deliver the job to another image processor 14 or 16 (S44). If it is determined at the step S44 that the server 18 is to deliver the job to another image processor 14 or 16, the procedure returns to the step S41.

If it is determined at the step S42 that the image processor(s) 14, 16 is/are not registered in the data recording unit 182, the data control unit 184 registers the information about the image processor(s) in the recording unit (S43).

Figure 8:
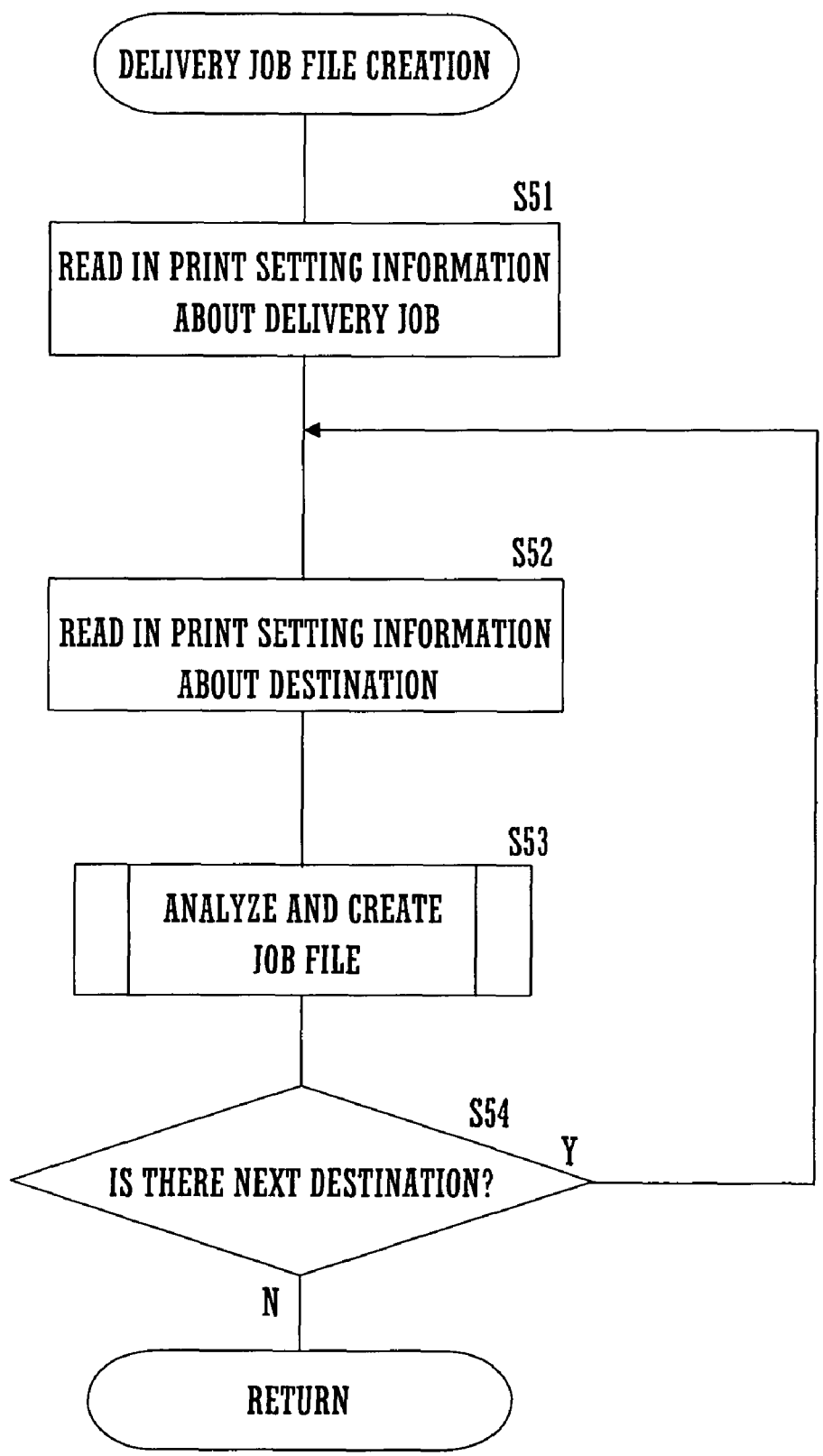
FIG. 8 is a flowchart showing the procedure performed by the image delivery server at a step of creating a delivery job file.

FIG. 8 is a flowchart showing the procedure performed by the image delivery server 18 at the step S22 of creating a delivery job file.

First, the data recording unit 182 of the server 18 reads in the print setting information about the received delivery job (S51).

Next, the data control unit 184 of the server 18 reads in the print setting information about the image processor(s) 14, 16 recorded in the data recording unit 182 (S52).

Next, the data control unit 184 compares the print setting information read in at the step S51 and the print setting information read in at the step S52. Based on the result of the comparison, the data control unit 184 creates a delivery job file (S53).

Next, the data control unit 184 determines whether the server 18 is to deliver the job to another image processor 14 or 16 (S54). If it is determined at the step S54 that the server 18 is to deliver the job to another image processor 14 or 16, the procedure returns to the step S52.

Figure 9:
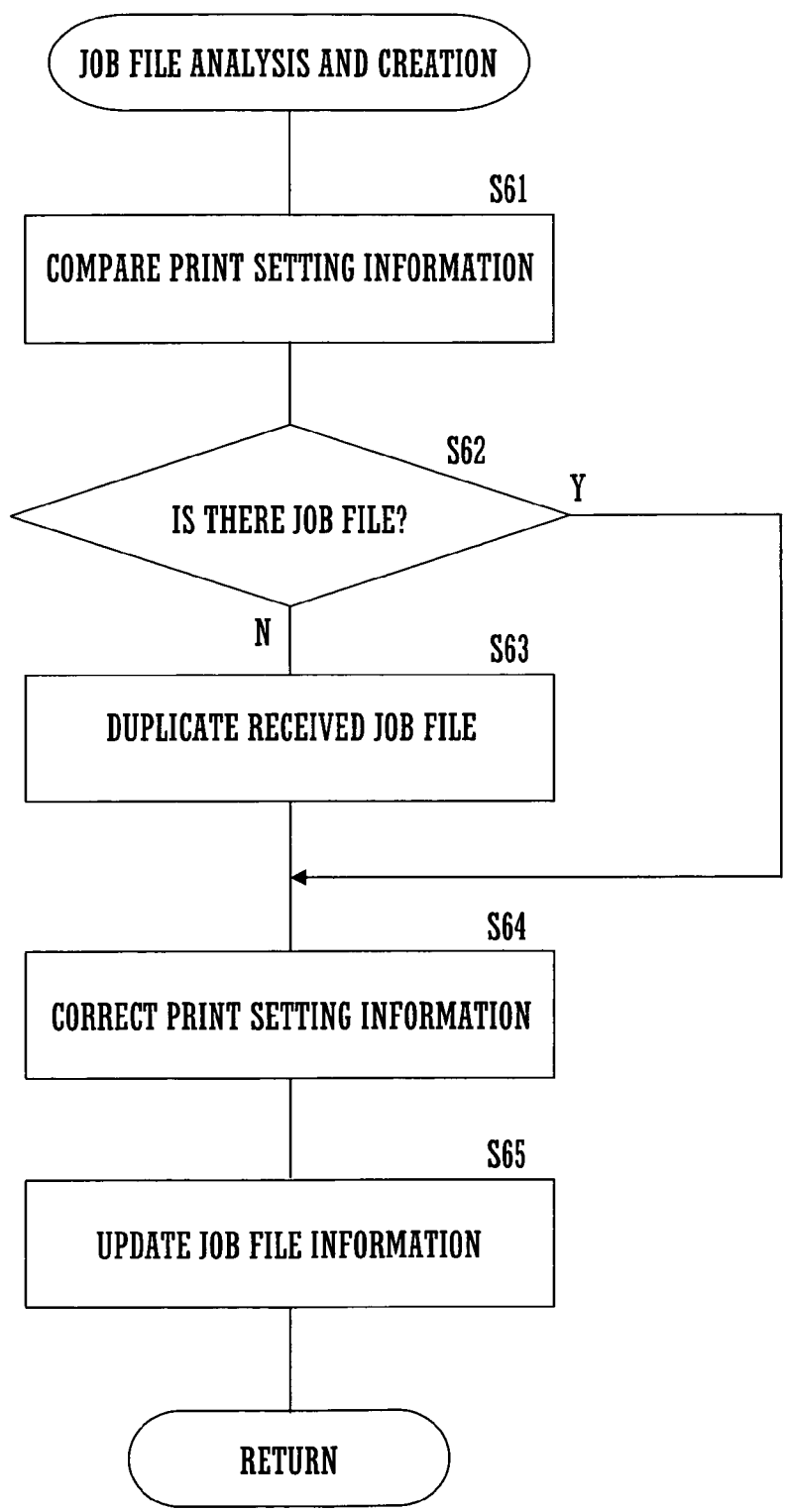
FIG. 9 is a flowchart showing the procedure performed by the image delivery server at a step of analyzing and creating a job file.

FIG. 9 is a flowchart showing the procedure performed by the image delivery server 18 at the step S53 of analyzing and creating a job file.

First, the data control unit 184 of the server 18 compares the print setting information read in at the step S51 and the print setting information read in at the step S52 (S61). At the step S61, the control unit 184 detects the difference of print information.

Based on the differential information detected at the step S61, the data control unit 184 determines whether there is a similar delivery job file (S62).

If it is determined at the step S62 that there is no similar delivery job file, the data control unit 184 duplicates the received job file (S63). If it is determined at the step S62 that there is a similar delivery job file, the procedure goes to the step S64, with the step S63 skipped.

At the step S64, the data control unit 184 corrects the difference of print setting information.

Next, the data control unit 184 updates the job file information in the data recording unit 182 (S65).

Figure 10:
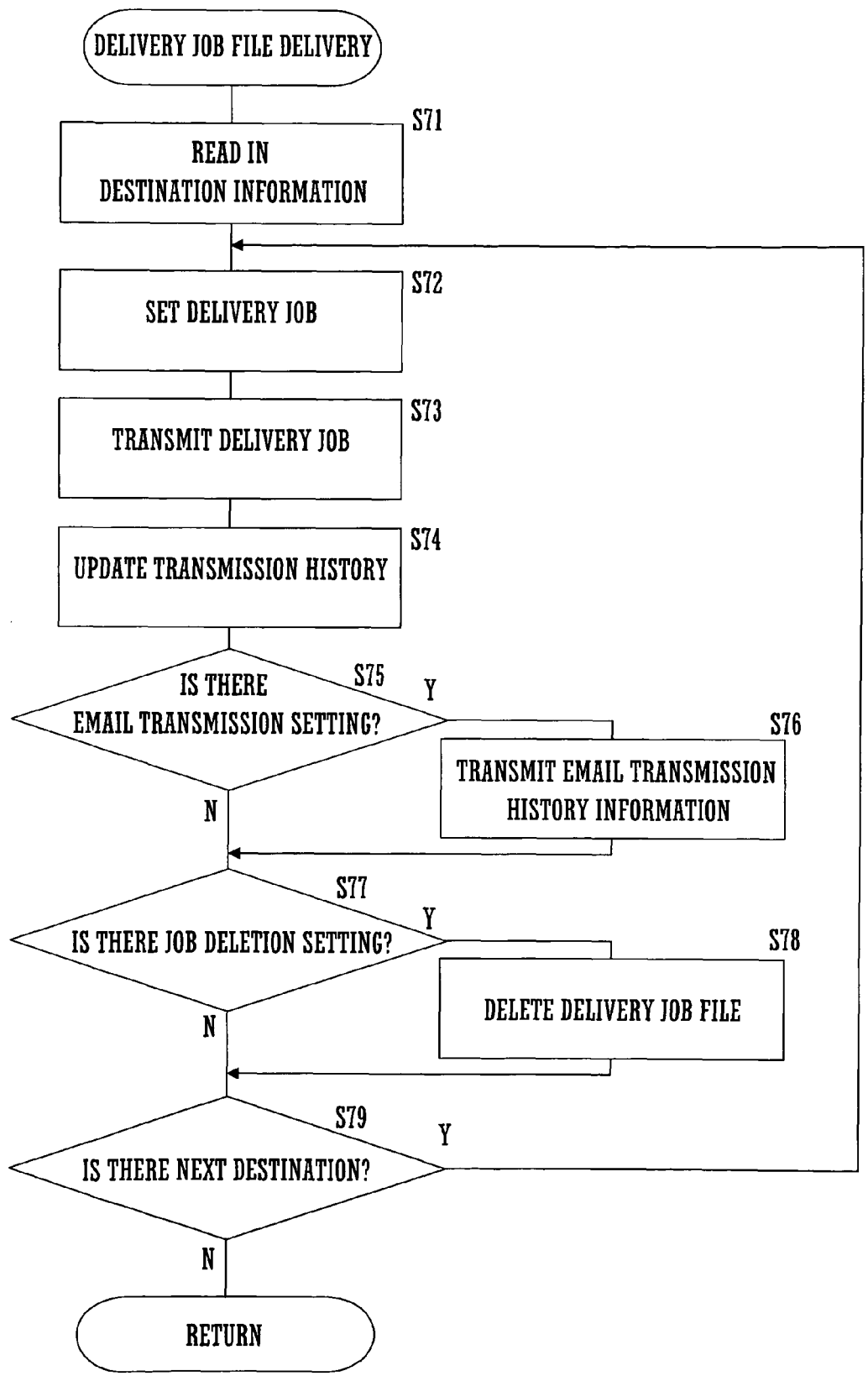
FIG. 10 is a flowchart showing the procedure performed by the image delivery server at a step of delivering a delivery job file.

FIG. 10 is a flowchart showing the procedure performed by the image delivery server 18 at the step S23 of delivering a delivery job file.

First, the data control unit 184 of the server 18 reads in the destination information recorded in the data recording unit 182 of the server (S71).

Based on the destination information read in at the step S71, the data control unit 184 sets a delivery job file and one or two destinations (S72).

Next, the data control unit 184 transmits to the destination(s) the delivery job set at the step S72 (S73).

Next, the data control unit 184 records in the data recording unit 182 the transmission history made at the step S73 (S74).

Next, the data control unit 184 reads in the setting recorded in the data recording unit 182 for email transmission to the manager of the image delivery system 10. Then, the control unit 184 determines whether there is a setting for necessary email transmission to the manager (S75).

If it is determined at the step S75 that there is a setting for necessary email transmission to the manager, the data control unit 184 transmits to the manager the transmission history recorded at the step S74 (S76).

Next, the data control unit 184 reads in the setting for job deletion recorded in the data recording unit 182. Then, the data control unit 184 determines whether there is a setting for job deletion (S77).

If it is determined at the step S77 that there is a setting for job deletion, the data control unit 184 deletes the delivery job file (S78).

Next, the data control unit 184 confirms the destination information read in at the step S71 (S79). If there is next destination information, the procedure returns to the step S72.

Figure 11:
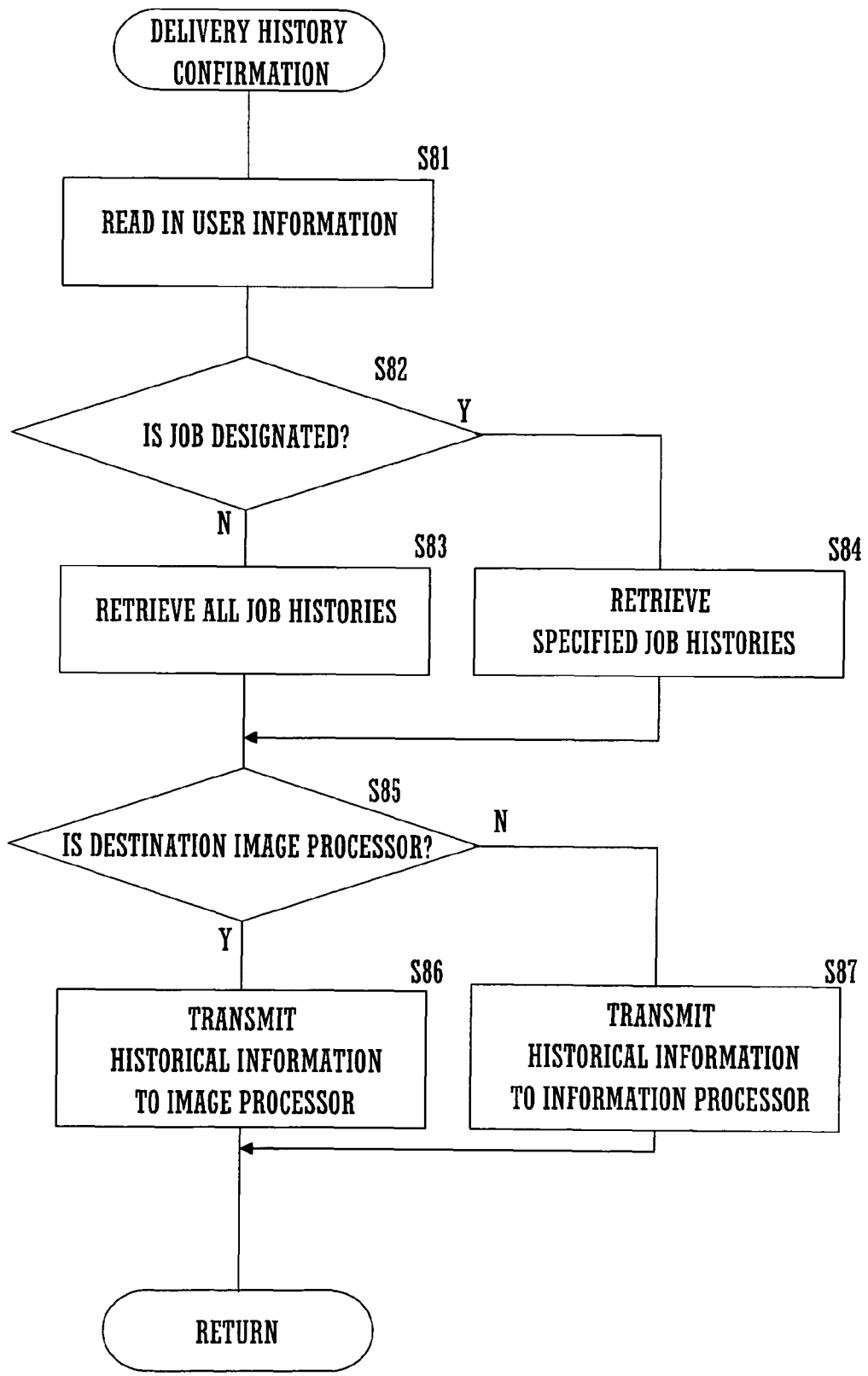
FIG. 11 is a flowchart showing the procedure performed by the image delivery server when the server confirms a delivery history.

FIG. 11 is a flowchart showing the procedure performed by the image delivery server 18 when the server confirms a delivery history.

First, the data control unit 184 of the server 18 reads in the operator information recorded in the data recording unit 182 of the server 18 about an operator (S81).

Next, the data control unit 184 determines whether a job is designated (S82).

If it is determined at the step S82 that no job is designated, the data control unit 184 retrieves all the job histories recorded in the data recording unit 182 for the operator (S83).

If it is determined at the step S82 that a job is designated, the data control unit 184 retrieves the job histories within the range specified for the operator (S84).

Next, the data control unit 184 determines the destination(s) of a delivery history (S85). At the step S85, the control unit 184 determines whether the destination(s) is/are the image processor(s) 14, 16.

If it is determined at the step S85 that the destination(s) is/are the image processor(s) 14, 16, the data control unit 184 transmits the retrieved job histories to the image processor(s) 14, 16 (S86).

If it is determined at the step S85 that the destination(s) is/are not the image processor(s) 14, 16, the data control unit 184 transmits the retrieved job histories to the information processor 12 (S87).

It is preferable that, when job delivery to the image processor(s) 14, 16 is completed, the image delivery server 18 should inform the information processor 12 through the communication unit 186 of the server that the delivery is completed. It is also preferable that, when a delivery job is completed, the image processor(s) 14, 16 should inform the information processor 12 through the communication unit(s) 145 of the image processor(s) that the job is completed.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An image delivery system for delivering a print job, the delivery system comprising an image delivery server, a plurality of image processors each comprising a printing unit, and an information processor, the image delivery server, the image processors and the information processor being connected to one another via a network, the image delivery server being adapted to deliver all at once a print job to each of the image processors connected to the network, the information processor supplying the image delivery server with print job data based on an entry operation of an operator, the print job data including at least image data and print setting information for each printing unit, respectively;

the image processor being configured to perform print processing based on the print job data supplied by the information processor;

the image delivery server including:

a data recording unit;

a setting recording unit for receiving the print job data and recording the received data in the data recording unit;

an updating unit capable of updating the recorded print setting information for at least one corresponding image processor based on input from at least one of the image processors, the updating unit receiving the print setting information from the image processor, reading processor information of the image processor that transmitted the print setting information, and updating the print setting information of the image processor that transmitted the print setting information; and a delivery unit for delivering all at once a print job to each of image processors connected to the network based on the updated print setting information.

2. The image delivery system as claimed in claim 1, wherein the print setting information includes at least one of sheet quantity information, double-side/single-side print setting information, and layout print setting information.

3. The image delivery system as claimed in claim 2, wherein the image delivery server includes:

a historical information recording unit in the data recording unit, the historical information recording unit for recording historical information about the job delivery to the image processor, and a historical information transmission unit for transmitting the recorded historical information to at least one of the image processor and the information processor.

4. The image delivery system as claimed in claim 3, wherein the image delivery server further includes a historical information retrieval unit for retrieving the recorded historical information based on information input from the image processor or the information processor.

5. The image delivery system as claimed in claim 4, wherein the image delivery server further includes a first notification unit for notifying the information processor that the delivery to the image processor is completed, when the job delivery is completed.

6. The image delivery system as claimed in claim 5, wherein the image processor includes a second notification unit for notifying the information processor that the print job is completed, when the delivered job is completed.

\* \* \* \* \*